United States Patent Office 3,793,223
Patented Feb. 19, 1974

3,793,223
DEFOAMER COMPOSITIONS CONTAINING ORGANIC PARTICLES
Irwin A. Lichtman, Oradell, and Fred E. Woodward, Watchung, N.J., assignors to Diamond Shamrock Corporation, Cleveland, Ohio
No Drawing. Continuation of application Ser. No. 837,297, June 27, 1969, now Patent No. 3,697,440, dated Oct. 12, 1972. This application June 15, 1972, Ser. No. 263,227
The portion of the term of the patent subsequent to Oct. 10, 1989, has been disclaimed
Int. Cl. B01d 17/00
U.S. Cl. 252—358                    11 Claims

ABSTRACT OF THE DISCLOSURE

Defoamer compositions are prepared by using particular oil insoluble normally solid organic polymer particles, secondary organic polymers which may be oil soluble or oil insoluble and liquid hydrocarbons. Optionally, amide and silicone oils are present.

---

This is a continuation of application Ser. No. 837,297, filed June 27, 1969, patented under No. 3,697,440 on Oct. 12, 1972.

This invention relates to defoamer compositions and more particularly to novel defoamers containing particles of normally solid oil insoluble organic polymers.

It is an object of the present invention to provide novel defoamer compositions containing particular normally solid oil insoluble organic polymer particles, secondary organic polymers which may be oil soluble or oil insoluble and liquid hydrocarbons. It is another object to provide for novel defoaming processes using the aforementioned defoamer compositions. Other objects of this invention will become apparent from the detailed description given herein. However, it is intended that the detailed description and specific examples do not limit this invention but merely indicate preferred embodiments.

SUMMARY OF THE INVENTION

The objects of this invention have been accomplished in the following manner. Defoamer compositions have been prepared by using particular normally solid oil insoluble organic polymer particles, secondary organic polymers which may be oil soluble or oil insoluble and liquid hydrocarbons. Optionally amides and silicone oils are present. The compositions contain from about one to about 25 parts by weight of normally solid oil insoluble organic polymer particles, from about one to about 30 parts by weight of secondary organic polymers which may be oil soluble or oil insoluble, from about 50 to about 90 parts by weight of liquid hydrocarbon as the vehicle, from 0 to about 25 parts by weight of normally solid amide and from 0 to about one part by weight of silicone oil.

These compositions are prepared by simple mixing of the components. For example, the oil soluble or oil insoluble secondary organic polymer and normally solid oil insoluble organic particles can be added to the liquid hydrocarbon vehicle. The normally solid amide, when used, is then added, the mixture homogenized and the silicone oil, when used, is added. Alternatively, the compositions can be prepared by heating together the normally solid oil insoluble organic particles, the secondary organic polymer, the amide, when used, and the liquid hydrocarbon vehicle provided that stabilizers are present in the normally solid polymer or added subsequently thereto. For example, if polyvinyl chloride particles are to be heated, the particles should contain any of the well known heat stabilizers for the polymer or else the stabilizers should be added to the system prior to heating.

THE OIL INSOLUBLE NORMALLY SOLID ORGANIC POLYMER

Useful oil insoluble normally solid organic polymer particles, include both thermoplastic, thermosetting and naturally occurring polymers. Examples of thermoplastic polymers are polyvinyl chloride; polyvinylidene chloride; polystyrene; polypropylene; high density polyethlene; polyamides, e.g., nylons, polyesters which are reaction products of dibasic acids, e.g., terephthalic acid, and glycols, e.g., hexamethylene glycol; cellulosics such as cellulose acetate, cellulose butyrate and purified cellulose; acrylics such as polymethyl methacrylate and polyethyl methacrylate; polyacrylonitrile and polyacrylamide. Copolymers are also useful. These are prepared by copolymerizing a monomer such as ethylene, propylene, styrene, vinyl chloride, acrylonitrile, etc. with a monoethylenically unsaturated monomer copolymerizable therewith. Such comonomer can itself be one of, e.g., ethylene, propylene, styrene, acrylonitrile, etc. Examples of such copolymers are the copolymer of ethylene and vinyl chloride and the copolymer of lauryl methacrylate and vinyl pyrrolidone in varying ratios of monomers.

Examples of thermosetting polymers are crosslinked polyesters, e.g., alkyd resins based on phthalic anhydride or maleic anhydride reacted with glycerine or any other polyester where either the acid or alcohol has more than two reactive groups; phenolic resins such as phenol-formaldehyde condensates, furfural-formaldehyde condensates and aminoplast resins such as urea-melamine resins and urea formaldehyde resins. Naturally occurring polymeric materials such as walnut shell flour, proteins, e.g., collagen, and lignin derivatives such as sodium and ammoninum lignin sulfonates are also suitable. It is preferred but not essential that such particles remain unsoftened at the temperature of the liquid whose foam is to be controlled. It is not necessary that such particles be water-insoluble as well. These polymers can be used alone or in admixture with each other.

The size of these particles can vary widely. Particles can be as fine as 0.02 micron or less and as large as 200 mesh or greater. The finer size particles are preferred, e.g., from 0.02 to 0.2 micron. It is believed that the coarser particles, e.g., 200 mesh, are reduced in particle size during the homogenization step in the preparation of the defoamer.

The polymer particles useful herein can be prepared directly, can be produced by precipitation of polymers from polymer solutions, by grinding of polymer solids or the like. Methods for the preparation of these polymer particles are well known and this invention is not limited to any particular method of particle formation. The particle size requirements and preparation for the normally solid amide particles are the same as for the polymer particles.

THE OIL SOLUBLE OR OIL INSOLUBLE SECONDARY POLYMER

Examples of the oil soluble or oil insoluble secondary polymer are set forth below. An example of a secondary oil soluble organic polymer is a copolymer of vinyl acetate and fumaric acid esterified with a tallow alcohol and containing excess vinyl acetate. This material is available from Enjay Chemical Co. in the form of a mineral oil solution thereof under the trade name "Paratone 440" which consists of about 25 parts by weight of copolymer in 75 parts by weight of a liquid hydrocarbon. This product has the following properties.

Viscosity at 210° F., cs. _____ 1300
Flash point, COC, ° F. _____ 360
Color, ASTM _____ 40
Specific gravity 60/60° F. _____ 0.92

Other useful oil soluble polymers include vinyl acetate copolymerized with ethylenically unsaturated comonomers which are copolymerizable therewith such as maleic acid esters, ethylene, propylene and butylene; polyalkylene oxide adducts such as methyl glucoside propoxylated with four moles of propylene oxide; glycerine propoxylated with thirty moles of ethylene oxide and thirty moles of propylene oxide; the copolymer of lauryl methacrylate and vinyl pyrrolidone; blown vegetable oils such as blown hydrogenated soya oil, blown vegetable oil and blown castor oil; soya alkyds; phenol modified coumaroneindene resins; glycerol esters of gum rosin and polyvinylpyrrolidone, which is a solid but only partially oil soluble. These materials can be used alone or in admixture with each other.

It should be noted that in some instances, the oil insoluble normally solid organic polymers and the secondary oil soluble or oil insoluble organic polymers are interchangeable such as in the case of the copolymer of lauryl methacrylate and vinyl pyrrolidone. However, to practice the invention, the defoamer composition must contain both classes of polymers.

THE LIQUID HYDROCARBON VEHICLE

The liquid hydrocarbon vehicle can be any liquid aliphatic, alicyclic, aromatic hydrocarbon. The hydrocarbon should be liquid at room temperature and atmospheric pressure, have a viscosity of from about 30 to about 400 SUS (Saybolt Universal Seconds at 100° F.), a minimum boiling point of at least 150° F. and an average from about 6 to 25 carbon atoms. Suitable hydrocarbons include hexane, heptane, octane, mineral seal oil, stoddard solvent, petroleum naphtha, benzene, toluene, xylene, paraffinic mineral oil, naphthenic mineral oil and the like. If desired, mixtures of two or more hydrocarbons can be used.

THE NORMALLY SOLID AMIDE

Useful normally solid amides include those obtained by reaction of a polyamine containing at least one alkylene group having from two to six carbon atoms and a fatty acid having from six to eighteen carbon atoms. Generally, the polyamine and fatty acid are reacted together in stoichiometrically equivalent amounts. For example, the amide can be obtained by reaction of a polyamine with a fatty acid or mixture of fatty acids such as hexanoic, decanoic, lauric, palmitic, oleic and stearic acids, hydroxy acids such as ricinoleic acid or naphthenic acids obtained as byproducts in the refining of petroleum. Natural mixtures of fatty acids such as tall oil acids, tallow fatty acids and the like can be used. Suitable amines include ethylene diamine, butylene diamine, diethylene triamine, triethylene tetramine, hexamethylene diamine, decamethylene diamine, hydroxyethyl ethylene diamine, 1,3-diamine-2-propanol and the like.

An amide useful herein is hydrogenated tallow diamine of ethylene diamine. It was prepared by charging 95.7 parts by weight of bleached-hydrogenated tallow fatty acids into a stainless steel reactor equipped with condenser, water trap and agitator. The entire process including charging of reactants and cooling of the reaction product is carried out under a nitrogen atmosphere. The acids are then heated to about 165° C. to about 175° C. and 10.1 parts by weight of ethylene diamine is added. After the diamine is added, the reaction mixture is heated with agitation to about 170° C. to about 185° C. The mixture is reacted at about 180° C. to about 185° C. until the acid value is less than 5 and the alkalinity less than 0.6% by weight. The resulting reaction product of ethylene diamine and tallow fatty acid is then cooled to room temperature. If desired, the cooled reaction product can be ground to obtain the product in the form of a very fine powder. One or a mixture of amides can be used if desired.

THE SILICONE OIL

The silicone oil can be a polysiloxane oil such as an alkyl, aryl, alicyclic or aralkyl siloxane or polysiloxane having a viscosity of from about 10 to about 3000 centistokes at 25° C. Preferred silicone oils include alkyl polysiloxanes having viscosities of from about 40 to about 1000 centistokes at 25° C. These alkyl polyisiloxanes include dimethyl polysiloxane, diethyl polysiloxane, dipropyl polysiloxane, methyl ethyl polysiloxane, dioctyl polysiloxane, dihexyl polysiloxane, methyl propyl polysiloxane, dibutyl polysiloxane, didodecyl polysiloxane and the like, each having a viscosity of from about 10 to about 3000 centistokes at 25° C.

The defoamer compositions of this invention are especially adapted to defoam, i.e., inhibit formation of foam and destroy existing foam, in aqueous systems such as are found in the preparation of latex, glues, resinous materials, starches, paper, pulp and the like. Defoamer compositions are used in small amounts depending upon the system in which they are employed. In general, from about 0.01% to about 0.5% by weight of the defoamer based on the foam producing materials present in the aqueous system is satisfactory. Amounts in excess of about 0.5% by weight can be used to defoam aqueous systems but generally these amounts are not practical.

The defoamer compositions of Examples 1 through 51 were evaluated using the apparatus and procedure described below. A 1000 cc. tall form beaker is used. A curved glass outlet fused onto the base of the beaker is connected with a rubber hose to a centrifugal pump. The pump is used to circulate continuously the test liquid from the beaker into the pump and back into the beaker. Pumping is carried out at a rate so that the test liquid in the beaker is agitated by the re-entering test liquid to such an extent that foam forms. The pumping rate is about two gallons per minute. Test liquid enters the beaker at a point about 2.25 inches above the surface of the liquid in the beaker and strikes the surface of the liquid in the beaker at an angle of 90°.

In carrying out the testing of the defoamer compositions, 500 cc. of concentrated pulping liquor containing about 0.5% tall oil soap is diluted 40:60 with water and charged at 180° F. into the beaker. This liquid, when quiescent at 180° F., fills the beaker to a level of about 3.25 inches from the bottom. This level is marked and labeled the 0 line. 0.1 cc. of defoamer composition is then added to the 500 cc. of test liquid in the beaker. Contents of the beaker are warmed to maintain the temperature at 180° F. during the test. The pump and stop watch are started simultaneously. Height of the foam above the 0 line is measured at 15-second intervals and recorded. An effective defoamer composition will maintain the height of the foam less than 3.15 inches above the 0 line for at least 60 seconds.

For a fuller understanding of the nature and objects of this invention, reference may be made to the following examples. These examples are given merely to illustrate the invention and are not to be construed in a limiting sense.

Where particle sizes of the normally solid polymer are not set forth in the examples, the material was reduced in size by grinding such that the resulting particles passed through a 300 mesh screen.

EXAMPLE 1

A defoamer composition was prepared by adding 10 parts by weight of Paratone 440 and 15 parts by weight of polyvinyl chloride particles to 71.8 parts by weight of mineral oil, then adding 3 parts by weight of amide, homogenizing in a Virtis "45" homogenizer and finally adding 0.2 part by weight of 50 centistokes dimethyl polysiloxane oil.

The polyvinyl chloride was a plastisol grade identified as Opalon 440 (Monsanto Co.). The polyvinyl chloride content of the plastisol was greater than 98.5% while the soap content was about 1%. The product is supplied as a fine white powder having an average particle size less than one micron, a specific gravity of 1.40 and a specific viscosity of 0.54–0.57 (a solution of 0.40 gram of polymer in 100 ml. of cyclohexanone).

The mineral oil was Paraffine Oil 372 (Gulf) and had the following properties:

Distillation range: initial, 566° F.; 50% complete @ 686° F. and end point at 818° F.
Percent paraffinics: 46
Percent naphthenics: 43
Percent aromatics: 11
Pour point: —45° F.
Flash point: 345° F.
Specific gravity @ 60° F.: 0.9042
Viscosity @ 100° F.: 100 SUS The amide was the hydrogenated tallow diamide of ethylene diamine obtained by reaction of hydrogenated tallow acids with ethylene diamine.

EXAMPLE 2

A defoamer composition was prepared by charging a vessel with 10 parts by weight of Paratone 440, 15 parts by weight of polyvinyl chloride particles having an average particle size of 0.5 micron and 71.2 parts by weight of mineral oil. 0.075 part by weight of each of two polyvinyl chloride stabilizers were added. One stabilizer was a mixed barium, cadmium, zinc salt of 2-ethyl hexanoic acid and the other was Drapex 6.8 (Argus Chem. Co.), an epoxy compound. At this point 2.0 parts by weight of hydrogenated tallow diamide of ethylene diamine was added, the mixture homogenized and then heated to 150° C. and held for 15 minutes at this temperature with vigorous stirring. The product was then cooled. 0.5 part by weight of a mixture of fatty amide and fatty esters and 1.0 part by weight of the aforesaid diamide were added. The mixture was homogenized, 0.20 part by weight of 50 centistoke dimethyl polysiloxane oil was added, and the mixture stirred.

EXAMPLE 3

Example 1 was repeated except that in place of the 10 parts by weight of Paratone 440, 10 parts by weight of blown soya oil was used.

Blown soya oil was prepared by bubbling air through refined soya bean oil at a temperature of 90° C., with agitation. This was continued until viscosity reached 1100 to 1200 seconds Saybolt Universal at 100° F.

EXAMPLE 4

Example 1 was repeated except that in place of the 10 parts by weight of Paratone 440, 10 parts of Unirez 628 was used.

Unirez 628 is the glycerol ester of gum rosin. The melting point by the ring and ball method is 91–96° C. The Gardner-Holdt viscosity of a 60% preparation in 38 KB mineral spirits is C-E. The acid number is 6–8 and the density in pounds/gallon is 9.1±0.1.

EXAMPLE 5

Example 1 was repeated except that in place of the 10 parts by weight of Paratone 440, 10 parts by weight of Elvax 150 was used.

Elvax 150 (Du Pont Co.) is a copolymer of vinyl acetate (32%–34%) and ethylene (66%–68%). It is a medium viscosity resin with an inherent viscosity at 30° C. (0.25 g./100 ml. toluene) of 0.78. The density at 23° C. is 0.957 g./cc.

EXAMPLE 6

Example 1 was repeated except that in place of the 10 parts by weight of Paratone 440, 10 parts by weight of Elvax 250 was used.

Elvax 250 (Du Pont Co.) is a copolymer of vinyl acetate (27%–29%) and ethylene (71%–73%). It has an inherent viscosity at 30° C. (0.25 g./100 ml. toluene) of 0.85. The density at 23° C. is 0.951 g./cc.

EXAMPLE 7

Example 1 was repeated except that in place of the 10 parts by weight of Paratone 440, 10 parts by weight of Elvax 310 was used.

Elvax 310 (Du Pont Co.) is a copolymer of vinyl acetate (24%–26%) and ethylene (74%–76%). It has an inherent viscosity at 30° C. (0.25 g./100 ml. toluene) of 0.54. The density at 23° C. is 0.049 g./cc.

EXAMPLE 8

Example 1 was repeated except that in place of the 10 parts by weight of Paratone 440, 10 parts by weight of Elvax 360 was used.

Elvax 360 (Du Pont Co.) is a copolymer of vinyl acetate (24%–26%) and ethylene (74%–76%). It has an inherent viscosity at 30° C. (0.25 g./100 ml. toluene) of 1.05. The density at 23° C. is 0.950 g./cc.

EXAMPLE 9

Example 1 was repeated except that in place of the 10 parts by weight of Paratone 440, 10 parts by weight of Dyal XAC–76 was used.

Dyal XAC–76 is a 64%–66% medium soya oil alkyd in xylene solvent. Soya oil and glycerin are Twitchellized and reacted with phthalic anhydride. The cure value is 60–90 seconds, and the acid value is about 5.

EXAMPLE 10

Example 1 was repeated except that in place of the 10 parts by weight of Paratone 440, 10 parts by weight of polyoxypropylene glycol of approximate molecular weight of 700 and having a hydroxyl number of 160 was used. This material was made by reaction of butyl alcohol with propylene oxide.

EXAMPLE 11

Example 1 was repeated except that in place of the 10 parts by weight of Paratone 440, 10 parts by weight of Nevillac 10° was used.

Nevillac 10° (Diamond Shamrock Chem. Co.) is a phenol-modified coumarone-indene resin. The product is a liquid at room temperature, having a softening point of 12° C. The specific gravity 30° C./15.6° C. is 1.090–1.110. The molecular weight (osmometer) No. average is 232. The hydroxy number is 210.

EXAMPLE 12

Example 1 was repeated except that in place of the 10 parts by weight of Paratone 440, 10 parts by weight of Troykyd (Troy Chemical Co.) XYZ was used.

Troykyd XYZ is an alkyd prepared from partially hydrogenated vegetable oil.

EXAMPLE 13

Example 1 was repeated except that in place of the 10 parts by weight of Paratone 440, 10 parts by weight of Thanol 6500 was used.

Thanol 6500 (Jefferson Chem. Co.) is a polyol of glycerine, ethylene oxide and propylene oxide. The molecular weight is approximately 6500, and the hydroxyl number is about 25.

EXAMPLE 14

Example 1 was repeated except that in place of the 10 parts by weight of Paratone 440, 10 parts by weight of Polyvinyl Pyrrolidone, Np–K30 (General Aniline and Film Co.) was used.

Polyvinyl Pyrrolidone Np–K30 has an average molecular weight of 40,000.

EXAMPLE 15

Example 1 was repeated except that in place of the 10 parts by weight of Paratone 440, 10 parts by weight of Poly-G 3030PG (Olin Chemicals Div.) was used.

Poly-G 3030PG is an alkylene oxide adduct of glycerine having a molecular weight of about 3,000, a hydroxyl number of 54.7–57.5, an acid number of 0.1, and a specific gravity of 1.008 (20/20° C.).

EXAMPLE 16

Example 1 was repeated except that in place of the 10 parts by weight of Paratone 440, 10 parts by weight of Poly-G 435 DM (Olin Chemicals Div.) was used.

Poly-G 435 DM is a propylene oxide adduct of methyl glucoside having a hydroxyl number of 435, an acid number of 0.10, and a viscosity of 18,000 centipoises at 25° C.

EXAMPLE 17

A defoamer composition was prepared as follows:
3.7 parts by weight of polypropylene were added to 50.2 parts by weight of paraffin oil and heated to 170° C. The polypropylene was Hercoflat PA–471 having an average particle size of 150 microns, melting point of 333° F., index of refraction of 1.5 and specific gravity of 0.9. Separately, 20.0 parts by weight of Paratone 440 were added to 20.0 parts of paraffin oil and heated to 80° C. The two mixtures were combined and cooled to 140° C. At this temperature 5.0 parts by weight of hydrogenated tallow diamide of ethylene diamine were added and the mixture stirred vigorously while cooling to room temperature. 0.5 part by weight of 50 centistoke silicone oil (dimethyl polysiloxane) were added and the mixture stirred vigorously until it appeared homogeneous. At this point, the mixture was diluted 1:1 with paraffin oil.

EXAMPLE 18

Example 1 was repeated except that in place of the 15 parts by weight of polyvinyl chloride particles, 15 parts by weight of purified wood cellulose (Solka-Floc BNB–40, Brown Co.) was used. This purified wood cellulose has an average particle length of 76 microns, an average particle width of 19 microns and a moisture content of approximately 6%.

EXAMPLE 19

Example 1 was repeated except that in place of the 15 parts by weight of polyvinyl chloride particles, 15 parts by weight of walnut shell flour (Agrashell, Inc., WF–3A) was used.

Agrashell WF–3A has an average chemical analysis of 60% by weight cellulose, 24% by weight lignin, 10% by weight furfural (calculated as pentosan), 5% by weight cutin and 6.5% by weight methoxy as principal components.

EXAMPLE 20

Example 1 was repeated except that in place of the 15 parts by weight of polyvinyl chloride particles, 15 parts by weight of Superlose (Stein-Hall Co.) was used.

Superlose is the amylose fraction of starch. It is a natural polymer having a molecular weight of about 150,000, a moisture content of 10% and an ash content of 0.5%. Superlose is chemically identical to cellulose, but has a coiled structure due to its alpha linkage, while the cellulose molecule is rigid.

EXAMPLE 21

Example 1 was repeated except that in place of the 15 parts by weight of polyvinyl chloride particles, 15 parts by weight of Elvacite 2041 (Du Pont Co.) was used.

Elvacite 2041 is a high molecular weight methyl methacrylate polymer having an average inherent viscostiy of 1.20 (as determined for a solution containing 0.25 g. polymer in 50 ml. chloroform at 25° C.). (An inherent viscosity of 0.40 corresponds to an average molecular weight of about 90,000.)

EXAMPLE 22

Example 1 was repeated except that in place of the 15 parts by weight of polyvinyl chloride particles, 15 parts by weight of Elvacite 2042 (Du Pont Co.) was used.

Elvacite 2042 is a very high molecular weight ethyl methacrylate polymer having an average inherent viscosity of 0.91 (as determined for a solution containing 0.25 g. polymer in 50 ml. chloroform at 25° C.).

EXAMPLE 23

Example 1 was repeated except that in place of the 15 parts by weight of polyvinyl chloride particles, 15 parts by weight of Elvacite 2045 (Du Pont Co.) was used.

Elvacite 2045 is a high molecular weight isobutyl methacrylate polymer having an average inherent viscosity of 0.66 (as determined for a solution containing 0.25 g. polymer in 50 ml. chloroform at 25° C.). An inherent viscosity of 0.55 corresponds to an average molecular weight of about 300,000.

EXAMPLE 24

Example 1 was repeated except that in place of the 15 parts by weight of polyvinyl chloride particles, 15 parts by weight of Amberol ST–140–F (Rohm & Haas Co.) was added.

Amberol ST–140–F is a phenol-formaldehyde polymer having an acid number of 20–40 and an approximate specific gravity of 1.04. A 64% solids solution in toluol has a Gardner-Holdt bubble tube viscosity range of I–Q.

EXAMPLE 25

Example 1 was repeated except that in place of the 15 parts by weight of polyvinyl chloride particles, 15 parts by weight of Saran Resin F–310 (Dow Chemical Co.) was added.

Saran F–310 resin is a copolymer of vinylidene chloride and acrylonitrile. The specific gravity 25/4° C. is 1.60. The viscosity of a 20% solution in methyl ethyl ketone is approximately 80 centipoises.

EXAMPLE 26

Example 1 was repeated except that in place of the 15 parts by weight of polyvinyl chloride particles, 15 parts by weight of Orzan A (Crown Zellerbach Co.) was added.

Orzan A is essentially ammonium lignin sulfonate plus wood sugars. It consists of 57% lignin sulfonic acids and 15% reducing sugars (calculated as glucose). Lignin is a wood polymer with an average molecular weight of about 10,000.

EXAMPLE 27

Example 1 was repeated except that in place of the 15 parts by weight of polyvinyl chloride particles, 15 parts by weight of Eastman EAB–171–2 (Eastman Chemical Products) was added.

Eastman EAB–171–2 is a cellulose acetate butyrate polymer containing an average of 1.5% hydroxyl, 29.5% acetal and 17% butyral radicals. The viscosity lies in the range of 5.6–9.4 poises and the specific gravity is 1.25.

EXAMPLE 28

Example 1 was repeated except that in place of the 15 parts by weight of polyvinyl chloride particles, 15 parts by weight of Swift's Technical Protein Colloid 40 Mega Special was used.

Swift's Technical Protein Colloid 40 Mega Special is an extracted, highly refined, dry granular protein of collagen source. The digestible protein content is approximately 85%.

EXAMPLE 29

A defoamer composition was prepared by adding 10 parts by weight of the glycerol ester of gum rosin (Unirez 628) and 15 parts by weight of purified wood cellulose (Solka-Floc BNB–40) to 71.8 parts by weight of mineral oil. Then 3 parts by weight of the amide of Example 1

EXAMPLE 29 (continued)

was added. The mixture was then homogenized in a Virtis "45" homogenizer. After homogenizing 0.2 part by weight of 50 centistoke silicone oil (dimethylpolysiloxane) was added.

EXAMPLE 30

Example 29 was repeated except that in place of Unirez 628, 10 parts by weight of blown soya oil was added.

EXAMPLE 31

Example 29 was repeated except that in place of Unirez 628, 10 parts by weight of Elvax 150 was used.

EXAMPLE 32

A defoamer composition was prepared by adding 10 parts by weight of Unirez 628 and 15 parts by weight of Swift's Technical Protein Colloid 40 Mega Special to 71.8 parts by weight of mineral oil. Then 3 parts by weight of the amide of Example 1 was added. The mixture was then homogenized in a Virtis "45" homogenizer. After homogenization, 0.2 part by weight of 50 centistoke silicone oil (dimethyl polysiloxane) was added.

EXAMPLE 33

Example 32 was repeated except that in place of Unirez 628, 10 parts by weight of blown soya oil was used.

EXAMPLE 34

Example 32 was repeated except that in place of the Unirez 628, 10 parts by weight of Elvax 150 was used.

EXAMPLE 35

Example 1 was repeated except that in place of the 3 parts by weight of hydrogenated tallow diamide of ethylene diamine, 3 parts by weight of stearyl diamide of hexamethylene diamine was added.

EXAMPLE 36

A defoamer composition was prepared by adding 10 parts by weight of Uevillac 10° and 15 parts by weight of ammonium lignin sulfonate to 71.7 parts by weight of mineral oil. Then, 3 parts by weight of the amide of Example 1 was added and homogenizing in a Virtis "46" homogenizer was carried out. After homogenizing, 0.2 part by weight of 50 centistoke silicone oil (dimethylpolysiloxane) was added.

EXAMPLE 37

Example 36 was repeated except that in place of ammonium lignin sulfonate, 15 parts by weight of Agrashell WF-3A was added.

EXAMPLE 38

Example 36 was followed except that in place of ammonium lignin sulfonate, 15 parts by weight of Eastman EAB-171-2 was added.

EXAMPLE 39

Example 36 was followed except that in place of ammonium lignin sulfonate, 15 parts by weight of Saran F-310 was used.

EXAMPLE 40

A defoamer composition was prepared by adding 5 parts by weight of Orzan A and 3 parts by weight of Elvax 150 to 81.8 parts by weight of paraffin oil. Then 10 parts by weight of stearyl diamide of hexamethylene diamine was added and homogenizing in a Virtis "45" homogenizer was carried out. After homogenizing, 0.2 part by weight of 50 centistoke silicon oil (dimethylpolysiloxane) was added.

EXAMPLE 41

Example 40 was repeated except that in place of the Elvax 150, 3 parts by weight of Troykyd XYV was added.

EXAMPLE 42

Example 40 was repeated except that in place of Elvax 150, 3 parts by weight of blown soya bean oil was added.

EXAMPLE 43

Example 40 was repeated except that in place of Elvax 150, 3 parts by weight of Unirex 628 was used.

EXAMPLE 45

Example 40 was repeated except that in place of Elvax 150, 3 parts by weight of blown soya oil were used, and the paraffin oil was replaced by mineral seal oil.

EXAMPLE 46

A defoamer composition was prepared by adding 25 parts by weight of Orzan A, 30 parts by weight of Elvax 150 and 15 parts by weight of the amide of Example 1 to 29.8 parts by weight of paraffin oil and homogenizing on a Virtis "45" homogenizer. 0.20 part by weight of 50 centistoke silicone oil (dimethylpolysiloxane) were then added.

EXAMPLE 47

Example 46 was repeated except that in place of Elvax 150, 30 parts by weight of Troykyd XYZ was used.

EXAMPLE 48

Example 46 was repeated except that in place of Elvax 150, 30 parts by weight of blown soya bean oil was used.

EXAMPLE 49

Example 46 was repeated except that in place of Elvax 150, 30 parts by weight of Unirez 628 was used.

EXAMPLE 50

A defoamer composition was prepared by charging a vessel with 15 parts by weight of Opalon 440, 10 parts by weight of Paratone 440 and 74.5 parts by weight of paraffin oil. Two polyvinyl chloride stabilizers were added at 0.075 part by weight of each, viz., a mixed barium, cadmium, zinc salt of 2-ethylhexanoic acid and Drapex 6.8 (Argus Chem. Co.) an epoxy compound. The mixture was homogenized, heated to 150° C. with stirring and held at that temperature for 15 minutes. It was then cooled to room temperature, homogenized and 0.2 part by weight of 50 centistoke silicone oil (dimethylpolysiloxane) was added, and the mixture was stirred.

EXAMPLE 51

Example 50 was followed except the amount of paraffin oil used was 74 parts by weight and 0.5 part by weight of a mixture of fatty amides and fatty esters were added to the mixture just prior to the final homogenization period. The mixture of fatty amides and esters contained coco fatty acid alkalolamide, oleic amide and an oleic ester of polyglycol of molecular weight of about 600.

The compositions of Examples 1 through 51 were tested for their defoaming ability using the method and apparatus described above. The test data obtained is set forth in Table I.

TABLE I

| Composition of example: | Time for foam to rise to 3.15 inch level above zero point (seconds) |
|---|---|
| 1 | 150 |
| 2 | 180 |
| 3 | 90 |
| 4 | 90 |
| 5 | 120 |
| 6 | 90 |
| 7 | 90 |
| 8 | 90 |
| 9 | 90 |
| 10 | 90 |
| 11 | 90 |
| 12 | 150 |

TABLE I—Continued

| Composition of example: | Time for foam to rise to 3.15 inch level above zero point (seconds) |
|---|---|
| 13 | 120 |
| 14 | 120 |
| 15 | 90 |
| 16 | 90 |
| 17 | 90 |
| 18 | 180 |
| 19 | 150 |
| 20 | 150 |
| 21 | 90 |
| 22 | 90 |
| 23 | 120 |
| 24 | 90 |
| 25 | 90 |
| 26 | 150 |
| 27 | 120 |
| 28 | 150 |
| 29 | 120 |
| 30 | 120 |
| 31 | 120 |
| 32 | 120 |
| 33 | 120 |
| 34 | 180 |
| 35 | 120 |
| 36 | 90 |
| 37 | 120 |
| 38 | 180 |
| 39 | 90 |
| 40 | 90 |
| 41 | 90 |
| 42 | 120 |
| 43 | 90 |
| 45 | 120 |
| 46 | 90 |
| 47 | 90 |
| 48 | 90 |
| 49 | 90 |
| 50 | 90 |
| 51 | 90 |
| Blank | 20 |

The composition of the following examples were evaluated using the following test method:

A 0:02% by weight solution in water of sodium dodecyl benzene sulfonate, a foam producing surfactant, was prepared. The surfactant was 46% active. A 200 cc. quantity of this solution, identified as the blank, was hand shaken in a 500 cc. Erlenmeyer flask in a reproducible manner. The foam reached a height of approximately one inch.

In conducting the evaluation, one drop of the defoamer composition to be tested was added to a freshly prepared 200 cc. quantity of test solution and the solution shaken in the same manner as done in the case of the blank. The presence of foam as observed and recorded.

EXAMPLE 52

A defoamer composition was prepared by adding 30 parts by weight of blown soya bean oil and 25 parts by weight of Orzan A to 29.8 parts by weight of mineral seal oil, adding 15 parts by weight of hydrogenated tallow diamide of ethylene diamine, homogenizing in a Virtis "45" homogenizer and finally adding 0.2 part by weight of 50 centistoke silicone oil (dimethlpolysiloxane oil).

EXAMPLE 53

Example 52 was repeated except that in place of the blown soya oil, 30 parts by weight of Troykyd XYZ was added and in place of the mineral seal oil, 29.8 parts by weight of kerosene was added.

EXAMPLE 54

Example 52 was repeated except that in place of Orzan A, 25 parts by weight of Agrashell WF–3A was added, the amide was eliminated and the kerosene was increased to 44.8 parts by weight.

EXAMPLE 55

Example 52 was repeated except that in place of Orzan A, 25 parts by weight of Agrashell WF–7A was added, in place of the blown soya oil, 30 parts of Paratone 440 was added, the amide was eliminated and 44.8 parts by weight of paraffin oil was added.

EXAMPLE 56

Example 52 was repeated except that in place of the blown soya oil, 30 parts by weight of Thanol 6500 was added, in place of the Orzan A, 25 parts by weight of Protein Colloid 40 Mega Special was added, the amide component was eliminated and the mineral seal oil content adjusted to 44.8 parts by weight.

EXAMPLE 57

Example 52 was repeated except that in place of the blown soya oil, 30 parts by weight of Elvax 150 was added, in place of the Orzan A, 25 parts by weight of Superlose was added, the amide component was eliminated and in place of mineral seal oil, 44.8 parts by weight of paraffin oil was added.

EXAMPLE 58

A defoamer composition was prepared by adding 30 parts by weight of Troykyd XYZ and 25 parts by weight of sodium lignin sulfonate (Orzan S, Crown Zellerbach Co.) to 41.2 parts by weight of mineral seal oil, adding 3 parts by weight of the hydrogenated tallow diamide of ethylene diamine, homogenizing in a Virtis "45" homogenizer and finally adding 0.2 part by weight of 50 centistoke silicone oil (dimethylpolysiloxane). Orzan S contains 48% lignin sulfonic acids, 12% reducing sugars (as glucose) and 20% ash. The primary cation is sodium. The water content is 5%.

EXAMPLE 59

Example 58 was repeated except that in place of Troykyd XYZ, 30 parts by weight of Elvax 150 was added.

EXAMPLE 60

Example 58 was repeated except that in place of Troykyd XYZ, 30 parts by weight of blown soya oil was added.

EXAMPLE 61

Example 58 was repeated except that in place of Troykyd XYZ, 30 parts by weight of Unirez 628 was added.

EXAMPLE 62

A defoamer composition was prepared by adding 30 parts by weight of Troykyd XYZ and 25 parts by weight of Agrashell WF–3A to 41.2 parts by wt. mineral seal oil, adding 3 parts by weight of the oleyl diamide of hexomethylene diamine, homogenizing in a Virtis "45" homogenizer. No silicone oil was added.

EXAMPLE 63

Example 62 was repeated except in place of the Troykyd XYZ, 30 parts by weight of Elvax 150 was added and 41.2 parts by weight of paraffin oil was used in place of mineral seal oil.

EXAMPLE 64

Example 62 was repeated except that in place of the Troykyd XYZ, 30 parts by weight of blown soya oil was added.

EXAMPLE 65

Example 62 was repeated except that in place of the Troykyd XYZ, 30 parts by weight of Unirez 628 was added.

EXAMPLE 66

A defoamer composition was prepared by adding 3 parts by weight of Olin Poly–G 3030 PG and 5 parts by weight of Eastman EAB-171-2 to 81.8 parts by weight of mineral oil, adding 10 parts by weight of the stearyl diamide of hexamethylene diamine, homogenizing in a Virtis "45" homogenizer and finally adding 0.2 part by weight of 50 centistoke silicone oil (dimethylpolysiloxane).

EXAMPLE 67

Example 66 was repeated except that in place of the Olin Poly-G 3030 PG, 3 parts by weight of Dyal XAC-76 was added and a less naphthenic mineral oil was added.

The mineral oil used was Paraffine Oil 333 (Gulf) and had the following properties:

| | |
|---|---|
| Percent paraffinics | 72 |
| Percent naphthenics | 24 |
| Percent aromatics | 4 |
| Pour point ° F. | 0 |
| Flash point ° F. | 380 |
| Specific gravity at 60° F. | 0.0760 |
| Viscosity at 100° F. | 100-100 SUS |
| Distillation range ° F. | 50% at 720° F. |

EXAMPLE 68

Example 66 was repeated except that in place of the Olin Poly-G 3030 PG, 3 parts by weight of Polyvinyl Pyrrolidone (Gen. Aniline and Film NP-K30) were added and 81.8 parts by weight of mineral seal oil were used in place of the mineral oil.

EXAMPLE 69

Example 66 was repeated except that in place of the Olin Poly-G 3030 PG, 3 parts by weight of Troykyd XYZ was added and 81.8 parts by weight of mineral seal oil were used in place of mineral oil.

EXAMPLE 70

A defoamer composition was prepared by adding 3 parts by weight of Troykyd and 5 parts by weight of Orzan S to 81.8 parts by weight of mineral oil, adding 10 parts by weight of the stearyl diamide of hexamethylene diamine, homogenizing on a Virtis "45" homogenizer and finally adding 0.2 part by weight of 50 centistoke silicone oil (dimethylpolysiloxane).

EXAMPLE 71

Example 70 was repeated except that in place of the Troykyd XYZ, 3 parts by weight of Elvax 150 was added.

EXAMPLE 72

Example 70 was repeated except that in place of the Troykyd XYZ, 3 parts by weight of blown soya oil was added.

EXAMPLE 73

The preparation method of Example 70 was repeated except that in place of the Troykyd XYZ, 3 parts by weight of Unirez 628 was added.

EXAMPLE 74

A defoamer composition was prepared by adding 3 parts by weight of Troykyd XYZ and 5 parts by weight of Swift's Protein Colloid 40 Mega Special to 81.8 parts by weight of Paraffine Oil 333 (Gulf Co.), adding 10 parts by weight of oleyl diamide of hexamethylene diamine, homogenizing in a Virtis "45" homogenizer and finally adding 0.2 part by weight of 50 centistoke silicone oil (dimethylpolysiloxane).

EXAMPLE 75

Example 74 was repeated except that in place of the Troykyd XYZ, 3 parts by weight of Elvax 150 was added and 81.8 parts of Gulf Paraffine Oil 372 was added in place of Gulf Paraffine Oil 333.

EXAMPLE 76

Example 74 was followed except that in place of the Troykyd XYZ, 3 parts by weight of blown soya oil was added.

EXAMPLE 77

Example 74 was repeated except that in place of the Troykyd XYZ, 3 parts by weight of Unirez 628 was added and 81.8 parts by weight of Gulf Paraffine Oil 372 was added in place of Gulf Paraffine Oil 333.

EXAMPLE 78

A defoamer composition was prepared by adding 3 parts by weight of Elvax 150 and 5 parts by weight of Solka-Floc BNB-40 to 91.8 parts by weight of Gulf Paraffine Oil 333, homogenizing in a Virtis "45" homogenizer and finally adding 0.2 part by weight of 50 centistoke silicone oil (dimethylpolysiloxane).

EXAMPLE 79

Example 78 was repeated except that 3 parts by weight of blown soya oil were added in place of the Elvax 150 and kerosene was used in place of Gulf Paraffine Oil 333.

EXAMPLE 80

Example 78 was repeated except that 3 parts by weight of Dyal XAC-76 were added in place of the Elvax 150 and mineral seal oil was used in place of the Gulf Paraffine Oil 333.

EXAMPLE 81

A defoamer composition was prepared by adding 5 parts by weight of Troykyd XYZ and 5 parts by weight of Eastman EAB-171-2 to 89.8 parts by weight of mineral seal oil, homogenizing in a Virtis "45" homogenizer and finally adding 0.2 part by weight of 50 centistoke silicone oil (dimethylpolysiloxane).

EXAMPLE 82

Example 81 was repeated except that 5 parts by weight of Clin Poly-G 3030 PG were added in place of the Troykyo XYZ and Gulf Paraffine Oil 372 was used in place of mineral seal oil.

EXAMPLE 83

Example 81 was repeated except that 5 parts by weight of Unirez 628 were added in place of the Troykyd XYZ and Gulf Paraffine Oil 333 was used in place of mineral seal oil.

EXAMPLE 84

A defoamer composition was prepared by adding 5 parts by weight of Olin Poly-G 3030 PG and 5 parts by weight of Superlose to 90 parts by weight of mineral seal oil and homogenizing in a Virtis "45" homogenizer.

EXAMPLE 85

Example 84 was repeated except that 5 parts by weight of blown soya oil was added in place of the Olin Poly-G 3030 PG and Gulf Paraffine Oil 372 was used in place of mineral seal oil.

EXAMPLE 86

A defoamer composition was prepared by adding 30 parts by weight of Unirez 628 and 25 parts by weight of Orzan S to 44.8 parts by weight of mineral seal oil, homogenizing in a Virtis "45" homogenizer and finally adding 0.2 part by weight of 50 centistoke silicone oil (dimethylpolysiloxane).

EXAMPLE 87

Example 86 was repeated except that 30 parts by weight of blown soya oil were added in place of the Unirez 628 and Gulf Paraffine Oil 333 was used in place of mineral seal oil.

EXAMPLE 88

Example 86 was repeated except that 30 parts by weight of Elvax 150 was added in place of Unirez 628 and Gulf Paraffine Oil 333 was used in place of mineral seal oil.

EXAMPLE 89

A defoamer composition was prepared by adding 30 parts by weight of blown soya oil and 25 parts by weight of Agrashell WP-7A to 44.8 parts by weight of kerosene, homogenizing in a Virtis "45" homogenizer and finally adding 0.2 part by weight of 50 centistoke silicone oil (dimethylpolyslsoxane oil).

EXAMPLE 90

Example 89 was repeated except that 30 parts by weight of Unirez 628 were added in place of the blown soya oil and Gulf Paraffine Oil 333 was used in place of kerosene.

EXAMPLE 91

Example 89 was repeated except that 30 parts by weight of Dyal XAC-76 were added in place of the blown soya oil and mineral seal oil was used in place of kerosene.

EXAMPLE 92

A defoamer composition was prepared by adding 30 parts by weight of blown soya oil and 25 parts by weight of Swift's Technical protein Colloid 40 Mega Special to 45 parts of mineral seal oil and homogenizing in a Virtis "45" homogenizer.

EXAMPLE 93

Example 92 was repeated except that 30 parts by weight of Dyal XAC-76 were added in place of the blown soya oil and Gulf Paraffine Oil 333 was used in place of mineral seal oil.

EXAMPLE 94

Example 92 was repeated except that 30 parts by weight of Olin Poly-G 3030 PG were added in place of the blown soya oil and Gulf Paraffine Oil 372 was used in place of mineral seal oil.

EXAMPLE 95

A defoamer composition was prepared by adding 30 parts by weight of blown soya oil and 25 parts by weight of Styron 678 (Dow Chemical Co.) to 45 parts by weight of Gulf Paraffine Oil 333 and homogenizing in a Virtis "45" homogenizer.

Styron 678 is a general purpose polystyrene having the following properties: specific gravity 1.04; melt viscosity 800 poises; Vicat softening point 194° F.

EXAMPLE 96

A defoamer composition was prepared by adding 6 parts by weight of Paratone 440 and 5 parts by weight of Styron 678 to 78.8 parts by weight of Gulf Paraffine Oil 372, adding 10 parts by weight of oleyl diamide of hexamethylene diamine, homogenizing on a Virtis "45" homogenizer and finally adding 0.2 part by weight of 350 centistoke silicone oil (dimethylpolysiloxane).

EXAMPLE 97

A defoamer composition was prepared by adding 5 parts by weight of Paratone 440 and 5 parts by weight of Styron 678 to 79 parts by weight of Gulf Paraffine Oil 333, adding 10 parts by weight of hydrogenated tallow diamide of ethylene diamine, homogenizing on a Virtis "45" homogenizer and finally adding 1.0 part by weight of 100 centistoke silicone oil (dimethylpolysiloxane).

EXAMPLE 98

A defoamer composition was prepared by adding 5 parts by weight of blown soya oil and 5 parts by weight of Solka-Floc BNB-40 to 79.5 parts by weight of Gulf Paraffine Oil 372, adding 10 parts by weight of stearyl diamide of hexamethylene diamine, homogenizing in a Virtis "45" homogenizer and finally adding 0.5 part by weight of 500 centistoke silicone oil (dimethylpolysiloxane).

EXAMPLE 99

Example 98 was repeated except that in place of the blown soya oil, 5 parts by weight of Olin Poly-G 3030 PG were added, Gulf Paraffine Oil 372 was added in place of the Gulf Paraffine Oil 333 and 0.5 part by weight of 10 centistoke silicone oil (dimethylpolysiloxane) was added in place of the 500 centistoke silicone oil.

EXAMPLE 100

A defoamer composition was prepared by adding 5 parts by weight of Paratone 440 and 5 parts by weight of Orzan 5 to 79.8 parts by weight of mineral seal oil, adding 10 parts by weight of oleyl diamide of hexamethylene diamine, homogenizing on a Virtis "45" homogenizer and finally addng 0.2 part by weight of 1,000 centistoke silicone oil (dimethylpolysiloxane).

EXAMPLE 101

A defoamer composition was prepared by adding 30 parts by weight of blown soya oil and 25 parts by weight of Orzan S to 41.8 parts by weight of Gulf Paraffine Oil 333, adding 3 parts by weight of stearyl diamide of hexamethylene diamine, homogenizing on a Virtis "45" homogenizer, and finally adding 0.2 part by weight of 10 centistoke silicone oil (dimethylpolysiloxane).

EXAMPLE 102

A defoamer composition was prepared by adding 30 parts by weight of Paratone 440 and 25 parts by weight of Eastman EAB-171-2 to 43.8 parts by weight of mineral seal oil, adding 1 part by weight of oleyl diamide of hexamethylene diamine, homogenizing on a Virtis "45" homogenzer and finally adding 0.2 part by weight of 500 centistoke silicone oil (dimethylpolysiloxane).

EXAMPLE 103

A defoamer composition was prepared by adding 30 parts by weight of blown soya oil and 25 parts by weight of Eastman EAB-171-2 to 43.5 parts by weight of Gulf Paraffine Oil 333, adding 1 part by weight of hydrogenated tallow diamide of ethylene diamine, homogenizing on a Virtis "45" homogenizer and finally adding 0.5 part by weight of 350 centistoke silicone oil (dimethylpolysiloxane).

EXAMPLE 104

A defoamer composition was prepared by adding 30 parts by weight of blown soya oil and 25 parts by weight of Eastman EAB-171-2 to 41.5 parts by weight of Gulf Paraffine Oil 372, adding 3 parts by weight of oleyl diamide of hexamethylene diamine, homogenizing on a Virtis "45" homogenizer, and finally adding 0.5 part by weight of 1,000 centistoke silicone oil (dimethylpolysiloxane).

Table II below sets forth the data obtained by testing the defoaming ability of Examples 1 and 52 through 104 using the aforedescribed sodium dodecyl benzene sulfonate solution.

TABLE II

| Composition of example: | Foam height |
|---|---|
| 1 | No foam. |
| 52 | No foam. |
| 53 | Slight foam. |
| 54 | No foam. |
| 55 | No foam. |
| 56 | No foam. |
| 57 | 0.5 inch foam. |
| 58 | 0.25 inch foam. |
| 59 | Slight foam. |
| 60 | No foam. |
| 61 | No foam. |
| 62 | 0.5 inch foam. |
| 63 | 0.5 inch foam. |
| 64 | No foam. |

TABLE II—Continued

| Composition of example: | Foam height |
|---|---|
| 65 | No foam. |
| 66 | No foam. |
| 67 | No foam. |
| 68 | No foam. |
| 69 | No foam. |
| 70 | No foam. |
| 71 | No foam. |
| 72 | No foam. |
| 73 | No foam. |
| 74 | No foam. |
| 75 | No foam. |
| 76 | No foam. |
| 77 | No foam. |
| 78 | No foam. |
| 79 | 0.25 inch foam. |
| 80 | 0.25 inch foam. |
| 81 | No foam. |
| 82 | No foam. |
| 83 | No foam. |
| 84 | No foam. |
| 85 | 0.5 inch foam. |
| 86 | No foam. |
| 87 | 0.5 inch foam. |
| 88 | 0.75 inch foam. |
| 89 | No foam. |
| 90 | No foam. |
| 91 | No foam. |
| 92 | 0.25 inch foam. |
| 93 | Slight foam. |
| 94 | 0.5 inch foam. |
| 95 | No foam. |
| 96 | No foam. |
| 97 | No foam. |
| 98 | No foam. |
| 99 | No foam. |
| 100 | No foam. |
| 101 | No foam. |
| 102 | No foam. |
| 103 | No foam. |
| 104 | No foam. |

What is claimed is:

1. A defoamer composition for aqueous systems consisting essentially of
   (a) from about 1 to about 25 parts by weight of polyvinyl chloride;
   (b) from about 1 to about 30 parts by weight of a copolymer of vinyl acetate and fumaric acid esterified with a tallow alcohol;
   (c) from about 50 to about 90 parts by weight of a hydrocarbon vehicle having a viscosity of from about 30 to about 400 Saybolt Universal Seconds at 100° F. and a minimum boiling point of at least 150° F.;
   (d) from 0 to about 25 parts by weight of normally solid amide which is the reaction product of a polyamine containing at least one alkylene group having from 2 to 6 carbon atoms and fatty acid having from 6 to 18 carbon atoms; and
   (e) from 0 to about 1 part by weight of silicone oil.

2. A defoamer composition for aqueous systems consisting essentially of
   (a) from about 1 to about 25 parts by weight of polyvinyl chloride;
   (b) from about 1 to about 30 parts by weight of a copolymer of vinyl acetate (32–34%) with ethylene (66–68%);
   (c) from about 50 to about 90 parts by weight of a hydrocarbon vehicle having a viscosity of from about 30 to about 400 Saybolt Universal Seconds at 100° F. and a minimum boiling point of at least 150° F.;
   (d) from 0 to about 25 parts by weight of normally solid amide which is the reaction product of a polyamine containing at least one alkylene group having from 2 to 6 carbon atoms and fatty acid having from 6 to 18 carbon atoms; and
   (e) from 0 to about 1 part by weight of silicone oil.

3. A deofamer composition for aqueous systems consisting essentially of
   (a) from about 1 to about 25 parts by weight of polyvinyl chloride;
   (b) from about 1 to about 30 parts by weight of soya alkyds;
   (c) from about 50 to about 90 parts by weight of from about 30 to about 400 Saybolt Universal Seconds at 100° F. and a minimum boiling point of at least 150° F.;
   (d) from 0 to about 25 parts by weight of normally solid amide which is the reaction product of a polyamine containing at least one alkylene group having from 2 to 6 carbon atoms and fatty acid having from 6 to 18 carbon atoms; and
   (e) from 0 to about 1 part by weight of silicone oil.

4. A defoamer composition for aqueous systems consisting essentially of
   (a) from about 1 to about 25 parts by weight of walnut shell flour;
   (b) from about 1 to about 30 parts by weight of a copolymer of vinyl acetate and fumaric acid esterified with a tallow alcohol;
   (c) from about 50 to about 90 parts by weight of a hydrocarbon vehicle having a viscosity of from about 30 to about 400 Saybolt Universal Seconds at 100° F. and a minimum boiling point of at least 150° F.;
   (d) from 0 to about 25 parts by weight of normally solid amide which is the reaction product of a polyamine containing at least one alkylene group having from 2 to 6 carbon atoms and fatty acid having from 6 to 18 carbon atoms; and
   (e) from 0 to about 1 part by weight of silicone oil.

5. A defoamer composition for aqueous systems consisting of
   (a) from about 1 to about 25 parts by weight of a phenolformaldehyde condensate;
   (b) from about 1 to about 30 parts by weight of a copolymer of vinyl acetate and fumaric acid esterified with a tallow alcohol;
   (c) from about 50 to about 90 parts by weight of a hydrocarbon vehicle having a viscosity of from about 30 to about 400 Saybolt Universal Seconds at 100° F. and a minimum boiling point of at least 150° F.;
   (d) from 0 to about 25 parts by weight of normally solid amide which is the reaction product of a polyamine containing at least one alkylene group having from 2 to 6 carbon atoms and fatty acid having from 6 to 18 carbon atoms; and
   (e) from 0 to about 1 part by weight of silicone oil.

6. A defoamer composition for aqueous systems consisting essentially of
   (a) from about 1 to about 25 parts by weight of walnut shell flour;
   (b) from about 1 to about 30 parts by weight of glycerol esters of gum rosin;
   (c) from about 50 to about 90 parts by weight of a hydrocarbon vehicle having a viscosity of from about 30 to about 400 Saybolt Universal Seconds at 100° F. and a minimum boiling point of at least 150° F.;
   (d) from 0 to about 25 parts by weight of normally solid amide which is the reaction product of a polyamine containing at least one alkylene group having from 2 to 6 carbon atoms and fatty acid having from 6 to 18 carbon atoms; and
   (e) from 0 to about 1 part by weight of silicone oil.

7. A defoamer composition for aqueous systems consisting essentially of
  (a) from about 1 to about 25 parts by weight of walnut shell flour;
  (b) from about 1 to about 30 parts by weight of a phenol modified coulmaroneindene resin;
  (c) from about 50 to about 90 parts by weight of a hydrocarbon vehicle having a viscosity of from about 30 to about 400 Saybolt Universal Seconds at 100° F. and a minimum boiling point of at least 150° F.;
  (d) from 0 to about 25 parts by weight of normally solid amide which is the reaction product of a polyamine containing at least one alkylene group having from 2 to 6 carbon atoms and fatty acid having from 6 to 18 carbon atoms; and
  (e) from 0 to about 1 part by weight of silicone oil.

8. A defoamer composition for aqueous systems consisting essentially of
  (a) from about 1 to about 25 parts by weight of sodium lignin sulfonate;
  (b) from about 1 to about 30 parts by weight of blown soya oil;
  (c) from about 50 to about 90 parts by weight of a hydrocarbon vehicle having a viscosity of from about 30 to about 400 Saybolt Universal Seconds at 100° F. and a minimum boiling point of at least 150° F.;
  (d) from 0 to about 25 parts by weight of normally solid amide which is the reaction product of a polyamine containing at least one alkylene group having from 2 to 6 carbon atoms and fatty acid having from 6 to 18 carbon atoms; and
  (e) from 0 to about 1 part by weight of silicone oil.

9. A defoamer composition for aqueous sytems consisting essentially of
  (a) from about 1 to about 25 parts by weight of ammonium lignin sulfonate;
  (b) from about 1 to about 30 parts by weight of an alkyd prepared from partially hydrogenated vegetable oil;
  (c) from about 50 to about 90 parts by weight of a hydrocarbon vehicle having a viscosity of from about 30 to about 400 Saybolt Universal Seconds at 100° F. and a minimum boiling point of at least 150° F.;
  (d) from 0 to about 25 parts by weight of normally solid amide which is the reaction product of a polyamine containing at least one alkylene group having from 2 to 6 carbon atoms and fatty acid having from 6 to 18 carbon atoms; and
  (e) from 0 to about 1 part by weight of silicone oil.

10. A defoamer composition for aqueous systems consisting essentially of
  (a) from about 1 to about 25 parts by weight of polypropylene;
  (b) from about 1 to about 30 parts by weight of a copolymer of vinyl acetate and fumaric acid esterified with a tallow alcohol;
  (c) from about 50 to about 90 parts by weight of a hydrocarbon vehicle having a viscosity of from about 30 to about 400 Saybolt Universal Seconds at 100° F. and a minimum boiling point of at least 150° F.;
  (d) from 0 to about 25 parts by weight of normally solid amide which is the reaction product of a polyamide containing at least one alkylene group having from 2 to 6 carbon atoms and fatty acid having from 6 to 18 carbon atoms; and
  (e) from 0 to about 1 part by weight of silicone oil.

11. A defoamer composition for aqueous systems consisting essentially of
  (a) from about 1 to about 25 parts by weight of a copolymer of acrylonitrile with vinylidene chloride;
  (b) from about 1 to about 30 parts by weight of a phenol modified coumaroneindene resin;
  (c) from about 50 to about 90 parts by weight of a hydrocarbon vehicle having a viscosity of from about 30 to about 400 Saybolt Universal Seconds at 100° F. and a minimum boiling point of at least 150° F.;
  (d) from about 25 parts by weight of normally solid amide which is the reaction product of a polyamine containing at least one alkylene group having from 2 to 6 carbon atoms and fatty acid having from 6 to 18 carbon atoms; and
  (e) from 0 to about 1 part by weight of silicone oil.

References Cited
UNITED STATES PATENTS 3,697,440   10/1972   Lichtman et al. _____ 252—321

JOHN D. WELSH, Primary Examiner

U.S. Cl. X.R.

252—321

UNITED STATES PATENT AND TRADEMARK OFFICE
CERTIFICATE OF CORRECTION

PATENT NO. : 3,793,223
DATED : February 19, 1974
INVENTOR(S) : Irwin A. Lichtman and Fred E. Woodward It is certified that error appears in the above-identified patent and that said Letters Patent are hereby corrected as shown below:

Column 1, line 9, "Oct. 12" should be --Oct. 10--; column 1, line 25, "Oct. 12" should be --Oct. 10--. Column 3, line 67, "170°C." should be --180°C.--. Column 6, line 13, "0.049" should be --0.949--. Column 7, line 53, "methoxy" should be --methoxyl--; column 7, line 71, "viscostiy" should be --viscosity--. Column 9, line 40, "Uevillac" should be --Nevillac--; column 9, line 43, "46" should be --45--; column 9, line 70, "silicon" should be --silicone--; column 9, line 75, "XYV" should be --XYZ--. Column 11, line 46, "0:02%" should be --0.02%--; column 11, line 56, "as" should be --was--; column 11, line 62, after the word "of" insert --the--; column 11, line 65, "(dimethlpolysiloxane oil)" should be --(dimethylpolysiloxane oil)--. Column 12, line 55, "hexo-" should be --hexa- --. Column 13, line 19, "0.0760" should be --0.8760--. Column 14, line 41, "Clin" should be --Olin--; column 14, line 42, "Troykyo" should be --Troykyd--. column 15, line 12, "methylpolysloxane" should be --methylpolysiloxane--;
Column 16, line 14, "Orzan 5" should be --Orzan S--; column 16, line 35, "homogenzer" should be --homogenizer--. Column 18, line 13, after the word "of" insert the following: --a hydrocarbon vehicle having a viscosity of--; column 18, lines 41 and 42, after "consisting" insert --essentially--. Column 19, line 6, "coulmaroneindene" should be --coumaroneindene--. Column 20, line 34, after "from" insert --0 to --.

Signed and Sealed this

Seventh Day of June 1977

[SEAL]

Attest:

RUTH C. MASON
Attesting Officer

C. MARSHALL DANN
Commissioner of Patents and Trademarks